No. 800,652. PATENTED OCT. 3, 1905.
J. D. JORDAN & R. W. STUBBLEFIELD.
NAILLESS HORSESHOE.
APPLICATION FILED JAN. 31, 1905.
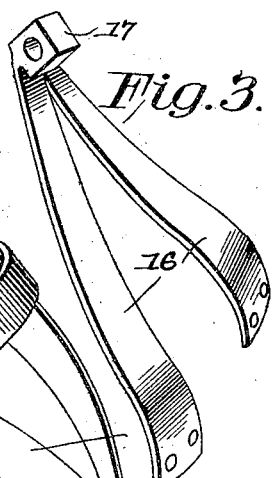
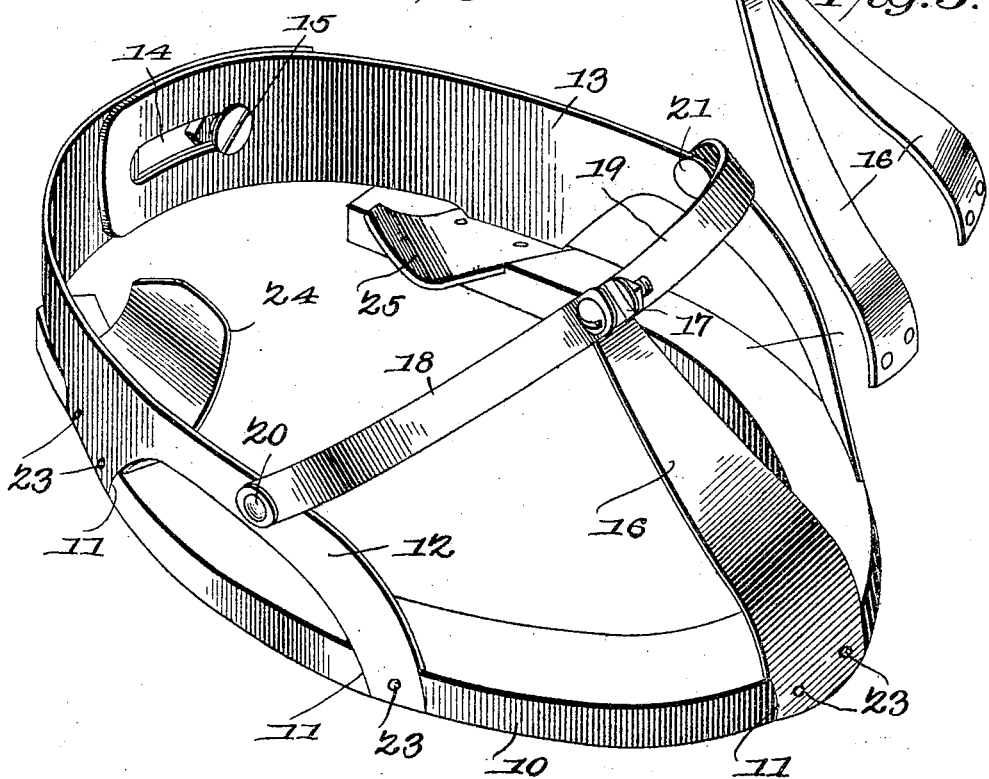
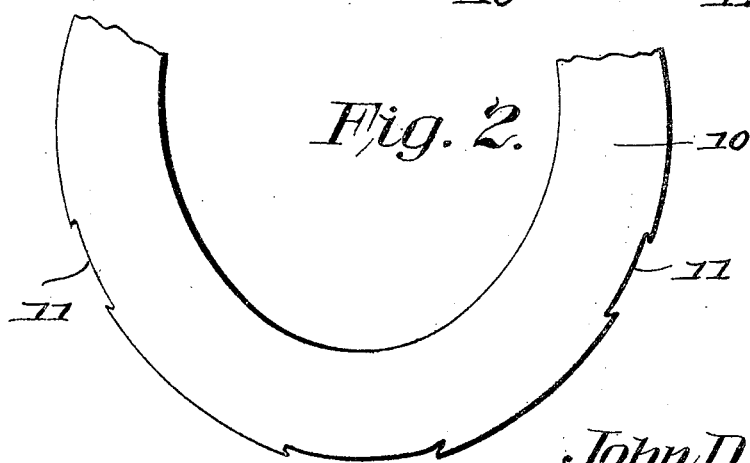
Witnesses
E. F. Stewart
C. H. Woodward
John D. Jordan
Robert W. Stubblefield, Inventors
by C. A. Snow & Co.
Attorneys

UNITED STATES PATENT OFFICE.

JOHN D. JORDAN AND ROBERT W. STUBBLEFIELD, OF EUREKA SPRINGS, ARKANSAS.

NAILLESS HORSESHOE.

No. 800,652.     Specification of Letters Patent.     Patented Oct. 3, 1905.

Application filed January 31, 1905. Serial No. 243,530.

*To all whom it may concern:*

Be it known that we, JOHN D. JORDAN and ROBERT W. STUBBLEFIELD, citizens of the United States, residing at Eureka Springs, in the county of Carroll and State of Arkansas, have invented a new and useful Nailless Horseshoe, of which the following is a specification.

This invention relates to horseshoes of the class wherein connection is made to the hoofs without inserting nails or other fastening means into the same, and has for its object to produce a device of this character of improved construction and increased efficiency.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings, Figure 1 is a perspective view of the improved device. Fig. 2 is a plan view of the "toe" portion of the "sole" member of the device. Fig. 3 represents a modified form of the toe-guard.

The improved device comprises a sole portion 10 of horseshoe shape and may be provided with the usual calks or left smooth, as preferred.

The sole member is provided at intervals with vertical recesses, as represented at 11 in Fig. 2, and preferably with dovetailed ends.

Inserted into certain of the recesses 11 are side plates 12 13, extending upwardly for partially embracing the hoof and curving around and overlapping at the rear and with transverse slots at 14 in the overlapping portions to receive a clamp-bolt 15. By this means the side plates may be adjusted laterally to adapt them to the size of the hoof to which the device is applied.

A toe-guard 16 is inserted by one end in the recess 11, which comes at the toe end of the sole member 10 and extends upwardly and rearwardly for bearing upon the forward or toe portion of the hoof and terminates in a socket 17.

Guard-straps 18 19 are each connected at one end, as at 20 21, to the forward portions of the side straps 12 13 and coupled at their other ends by a tie-bolt 22 to the socket 17.

The side plates 12 13 and toe-plate 16 are secured to the sole member 10 within the recesses 11, as by rivets 23, or they may be attached in any other suitable manner.

Guard-plates 24 25 are attached to the "heel" portions of the sole member and extend inwardly and are curved upwardly for bearing beneath the softer parts of the heel portion of the hoof and protecting and supporting the same.

With a horseshoe thus constructed, it is obvious that attachment may be made to the hoof without inserting nails or other fastening means into the hoofs. It is also obvious that the shoe may be readily adjusted to the various sizes and contours of hoofs by means of the clamp-screw 15 and slots 14 and by shortening or lengthening the guard straps or braces 18 19.

The parts may be of any required size or strength or of any suitable material and may be readily adapted to all animals which require metal shoes.

The toe-guard 16 may be forked, as shown in Fig. 3, and attached to the body of the shoe at two points; but this would not be a departure from the spirit of the invention, as the same results would be accomplished in substantially the same manner.

Having thus described the invention, what is claimed is—

1. A horseshoe comprising a sole member in horseshoe form, straps connected to the sides of the sole member and overlapping at the rear of the same and provided with transverse slots in the overlapping portions, a clamp-bolt passing through said slots and adjustably coupling the side plates, a toe-guard connected to the forward end of the sole member for extending over the front of the hoof, and straps connected respectively at one end to said side plates and coupled detachably by their other ends to the free end of said toe-guard.

2. A horseshoe comprising a sole member in horseshoe form and provided with spaced vertical recesses in the outer face, side straps connected in said recesses and overlapping at the rear of the sole member and provided with transverse slots in the overlapping portions, a clamp-bolt passing through said slots, a toe-guard connected by one end in one of said sole recesses and with a transverse socket in its free end, and guard-straps connected respectively at one end to said side straps and coupled by their other ends detachably to said toe-guard socket.

3. A horseshoe comprising a sole member in horseshoe form, straps connected to the sides of the sole member and overlapping at the rear of the same and provided with transverse slots in the overlapping portions, a clamp-bolt passing through said slots and adjustably coupling the side plates, a toe-guard connected to the forward end of the sole member for extending over the front of the hoof, straps connected respectively at one end to said side plates and coupled detachably by their other ends to the free end of said toe-guard, and plates connected to the heel portions of said sole member and extending inwardly therefrom and curving upwardly for protecting the softer parts of the heel portions of the hoof and bearing beneath the same.

In testimony that we claim the foregoing as our own we have hereto affixed our signatures in the presence of two witnesses.

JOHN D. JORDAN.
    ROBT. W. STUBBLEFIELD.

Witnesses:
 O. M. CLARK,
 EVA FREE.